United States Patent
Kudo et al.

(10) Patent No.: US 10,509,808 B2
(45) Date of Patent: Dec. 17, 2019

(54) DATA ANALYSIS SUPPORT SYSTEM AND DATA ANALYSIS SUPPORT METHOD

(71) Applicant: Hitachi, Ltd., Chiyoda-ku, Tokyo (JP)

(72) Inventors: Fumiya Kudo, Tokyo (JP); Tomoaki Akitomi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 426 days.

(21) Appl. No.: 15/534,576

(22) PCT Filed: Apr. 21, 2015

(86) PCT No.: PCT/JP2015/062115
§ 371 (c)(1),
(2) Date: Jun. 9, 2017

(87) PCT Pub. No.: WO2016/170600
PCT Pub. Date: Oct. 27, 2016

(65) Prior Publication Data
US 2018/0260470 A1 Sep. 13, 2018

(51) Int. Cl.
*G06F 16/28* (2019.01)
*G06F 16/22* (2019.01)

(52) U.S. Cl.
CPC ........ *G06F 16/285* (2019.01); *G06F 16/2228* (2019.01)

(58) Field of Classification Search
CPC .............. G06F 16/285; G06F 16/2228; G06F 16/24578; G06F 16/9535
See application file for complete search history.

(56) References Cited

U.S. PATENT DOCUMENTS

| | | | |
|---|---|---|---|
| 2013/0339278 A1* | 12/2013 | Aoki | G06N 20/00 706/12 |
| 2015/0339782 A1* | 11/2015 | Fondekar | G06F 16/285 705/30 |
| 2016/0004801 A1* | 1/2016 | Natsumeda | G06F 17/5009 703/13 |

FOREIGN PATENT DOCUMENTS

| | | |
|---|---|---|
| JP | 2000-237146 A | 9/2000 |
| JP | 2002-278762 A | 9/2002 |
| JP | 2006-39970 A | 2/2006 |
| JP | 2008-117016 A | 5/2008 |

(Continued)

OTHER PUBLICATIONS

International Search Report (PCT/ISA/210) issued in PCT Application No. PCT/JP2015/062115 dated Jul. 28, 2015 with English translation (Five (5) pages).

(Continued)

*Primary Examiner* — Cam Y T Truong
(74) *Attorney, Agent, or Firm* — Crowell & Moring LLP

(57) ABSTRACT

Provided is a data analysis support system, comprising a processor, and a storage device which is coupled to the processor. The storage device retains objective index information which associates primary key values with objective index values, and explanatory index information which associates values common to the primary keys with sets of values of explanatory indices of a plurality of items. The processor selects one or more items of the explanatory indices, clusters the values of the explanatory indices of the selected one or more items, identifies a range of the values of the explanatory indices of each of the items of each of the clusters which are obtained by the clustering, and outputs the identified value ranges.

10 Claims, 17 Drawing Sheets

(56) References Cited

FOREIGN PATENT DOCUMENTS

WO    WO 2015/049797 A1    4/2015

OTHER PUBLICATIONS

Japanese-language Written Opinion (PCT/ISA/237) issued in PCT Application PCT Application No. PCT/JP2015/062115 dated Jul. 28, 2015 (Four (4) pages).

\* cited by examiner

| SHOP NAME | CUSTOMER ID | AGE | ENTRANCE TIME | PURCHASED ITEM |
|---|---|---|---|---|
| A | 1000 | 22 | 9:12 | STATIONERY |
| A | 1000 | 22 | 9:12 | STATIONERY |
| A | 1000 | 22 | 9:12 | GROCERY |
| A | 1001 | 27 | 12:50 | GROCERY |
| A | 1001 | 27 | 12:50 | GROCERY |
| : | : | : | : | : |
| Z | 1098 | 38 | 12:31 | GROCERY |
| Z | 1099 | 43 | 12:46 | STATIONERY |
| Z | 1100 | 65 | 17:02 | KITCHENWARE |
| Z | 1100 | 65 | 17:02 | KITCHENWARE |

*FIG. 2A*

| SHOP NAME | SALES [JPY] |
|---|---|
| A | 127,000 |
| B | 256,000 |
| C | 170,000 |
| : | : |
| Z | 330,000 |

*FIG. 2B*

| 302 | 301 ↙ | | | | | |
|---|---|---|---|---|---|---|
| | #name | SHOP NAME | CUSTOMER ID | AGE | ENTRANCE TIME | PURCHASED ITEM |
| 303 | #type | CHARACTER STRING TYPE | CHARACTER STRING TYPE | NUMERICAL TYPE | TIME TYPE | TEXT TYPE |

*FIG. 3A*

| | 401 ↙ | | |
|---|---|---|---|
| 402 | #name | SHOP NAME | SALES [JPY] |
| 403 | #type | CHARACTER STRING TYPE | NUMERICAL TYPE |
| 404 | #is_primary | 1 | 0 |
| 405 | #is_purpose | 0 | 1 |

*FIG. 3B*

DATA ANALYSIS SUPPORT SYSTEM AND DATA ANALYSIS SUPPORT METHOD

BACKGROUND OF THE INVENTION

This invention relates to the technology for supporting data analysis.

The technology for supporting data analysis includes a technique disclosed in JP 2000-237146 A. This document discloses grouping test subjects based on multiple correlation coefficients obtained on multiple indices.

SUMMARY OF THE INVENTION

In recent years, systems that utilize big data concerning business performance stored in companies to analyze the factors contributable to improvement in business performance have been developed actively. An analyst studies which conditions can be the factors to improve the business performance, using a huge amount of data including a variety of information. In this process, it is typical that the analyst combines items that could be relevant to the business performance to generate feature values and repeatedly tests a hypothesis by applying data to a model. However, as the size of data to be analyzed increases, it has become more difficult for the analyst to manually process the data and detect relevance. For this reason, development of a system for supporting the analysis of large scale data is demanded.

Specifically, demanded is development of a system for supporting the analysis by automatically creating a feature value that could be a factor in the analysis target. To achieve such a technique, JP 2000-237146 A sorts the test subjects into a plurality of groups using correlation coefficients obtained on multiple indices (columns of an input table) input about multiple test subjects. However, the columns to be input in JP 2000-237146 A are fixed and the columns themselves are used as feature values; accordingly, the technique of JP 2000-237146 A cannot create a feature value highly correlated with the objective index.

To solve the foregoing problem, an embodiment of this invention provides a data analysis support system comprising: a processor; and a storage device coupled to the processor, wherein the storage device is configured to hold: objective index information in which values of a primary key are associated with values of a objective index; and explanatory index information in which values in common with the values of the primary key are associated with sets of values of a plurality of explanatory index items, and wherein the processor is configured to: select one or more explanatory index items; perform clustering on the values of the selected one or more explanatory index items; and determine value ranges of individual explanatory index items in each cluster obtained through the clustering and output the determined value ranges.

An aspect of this invention can automatically create possible feature values that can be easily interpreted by humans from an input table to be analyzed. The generated feature values can be used to facilitate a variety of analysis. The issues, configurations, and effects other than those described as above are clarified in the following description of the embodiments.

BRIEF DESCRIPTION OF THE DRAWINGS

FIGS. 2A and 2B are explanatory diagrams showing specific examples of input tables to be input to a feature value generation module in Embodiment 1 of this invention.

FIGS. 3A and 3B are explanatory diagrams of specific examples of column information tables holding information on the columns of an explanatory index table and an objective index table in Embodiment 1 of this invention.

DETAILED DESCRIPTION OF THE EMBODIMENTS

Embodiment 1

Hereinafter, an embodiment of this invention is described with reference to the drawings.

Figure 1:
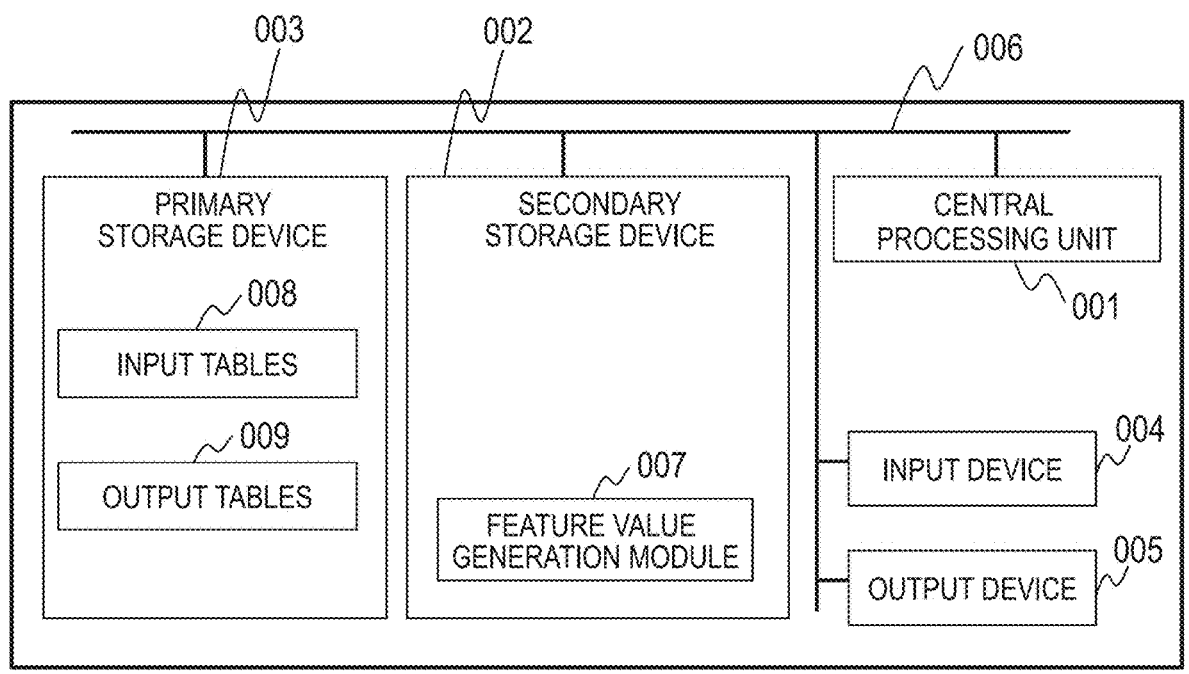
FIG. 1 is a block diagram for illustrating a hardware configuration of a data analysis support system in Embodiment 1 of this invention.

FIG. 1 is a block diagram for illustrating a hardware configuration of a data analysis support system in Embodiment 1 of this invention.

The data analysis support system in this embodiment is a computer including a central processing unit 001, a secondary storage device 002, a primary storage device 003, an input device 004, and an output device 005; in the computer, the central processing unit 001, the secondary storage device 002, the primary storage device 003, the input device 004, and the output device 005 are connected by a bus 006.

The central processing unit 001 is a processor for executing programs stored in the secondary storage device 002 and the primary storage device 003.

The secondary storage device 002 is a high-capacity and non-volatile storage device such as a magnetic storage device or a flash memory and stores a feature value generation module 007 calculated by the central processing unit 001 executing a program. The feature value generation module 007 can be, for a part or the entirety thereof, copied to the primary storage device 003 as necessary to be calculated by the central processing unit 001.

The primary storage device 003 is high-speed and volatile storage device such as a dynamic random access memory (DRAM) and stores an operating system (OS) and application programs. The central processing unit 001 executes the operating system to implement basic functions of the computer and executes the application programs to implement the functions to be provided by the computer. Specifically, the primary storage device 003 stores input tables 008 and output tables 009.

The input device 004 is a user interface such as a keyboard or a mouse. The output device 005 is a user interface such as a display device or a printer.

The system may include a communication interface (not shown) for connecting to a network and controlling communication with other apparatuses. In this case, the system is connected with a terminal (not shown) via the communication interface; the terminal has the input device 004 and the output device 005; and the central processing unit 001 processes tables in accordance with a request from the terminal and outputs a processing result to the terminal through the communication interface.

The system can be constructed on a single physical computer or otherwise, constructed on a logical partition configured on one or more physical computers.

Next, the input tables 008 to be input to the feature value generation module 007 are described in detail.

The analyst can analyze the massive amount of data in various ways using the feature values generated by this system.

FIGS. 2A and 2B are explanatory diagrams showing specific examples of the input tables 008 to be input to the feature value generation module 007 in Embodiment 1 of this invention.

FIGS. 2A and 2B provide input tables 008 including the sales of retail shops and customer data collected by the retail shops for specific examples.

This system receives an explanatory index table 101 (FIG. 2A) including collected customer data, a objective index table 201 (FIG. 2B) including the sales to be analyzed, a column information table 301 (FIG. 3A) and a column information table 401 (FIG. 3B) about the information on the columns of the foregoing two tables.

The explanatory index table 101 is a table including columns of explanatory indices such as shop name 102, customer ID 103, age 104, entrance time 105, and purchased item 106. A shop name 102 identifies a shop, which is a unit in compiling data. A customer ID 103 identifies a customer who purchased an item in the shop. An age 104 indicates the age of the customer. An entrance time 105 and a purchased item 106 indicate the time when the customer entered the shop and the item the customer purchased in the shop.

The objective index table 201 is a table including a column of shop names 202 for identifying shops, which are units in compiling data, and a column of sales 203 for indicating the amount of sales of each shop, which is the target of the analysis.

FIGS. 3A and 3B are explanatory diagrams of specific examples of column information tables holding information on the columns of the explanatory index table 101 and the objective index table 201 in Embodiment 1 of this invention.

The column information 301 on the explanatory index table includes column names 302 for identifying the columns of the explanatory index table 101 and type names 303 for indicating the types of data in the corresponding columns. According to this example, the shop names 102, the customer IDs 103, and the purchased items 106 include character-string-type data, and the ages 104 and the entrance times 105 include numerical-type data and time-type data, respectively.

The column information 401 on the objective index table includes column names 402 for identifying the columns of the objective index table 201, type names 403 for indicating the types of data in the corresponding columns, primary key column information 404 for indicating whether the corresponding column includes primary keys representing units of data compilation, and objective index column information 405 for indicating whether the corresponding column is a objective index column. The example of FIG. 3B indicates that the shop name 202 in the objective index table 201 is the primary key and the sales 203 is the objective index. Furthermore, this example indicates that the shop names 202 include character-string-type data like the shop names 102 and the sales 203 include numerical-type data.

The term "objective index (objective variable)" means an index to be estimated and the term "explanatory index (explanatory variable)" means an index for explaining the objective index (or estimating the objective index based thereon). This embodiment is to estimate the amount of sales of each shop based on the ages, the entrance times, and the purchased items; accordingly, the age, the entrance time, and the purchased item are explanatory indices and the amount of sales is the objective index. As shown in the explanatory index table 101 in FIG. 2A, a shop name in common with a primary key of the objective index table 201 is associated with a set of values of a plurality of explanatory indices such as the age, the entrance time, and the purchased item.

Figure 4:
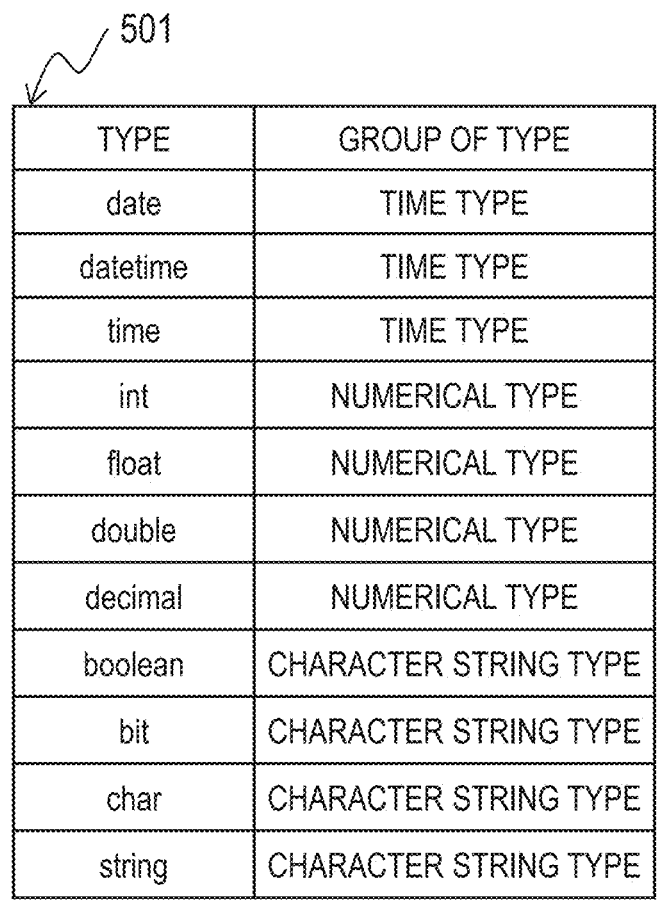
FIG. 4 is an explanatory diagram showing an example of type groups for the data types of the columns of the tables in Embodiment 1 of this invention.

FIG. 4 is an explanatory diagram showing an example of type groups for the data types of the columns of the tables in Embodiment 1 of this invention.

This system generally groups the data types to time type, numerical type, and character string type. Taking examples of types for common relational databases in structured query language (SQL), the corresponding types are provided in the table 501.

Figure 5:
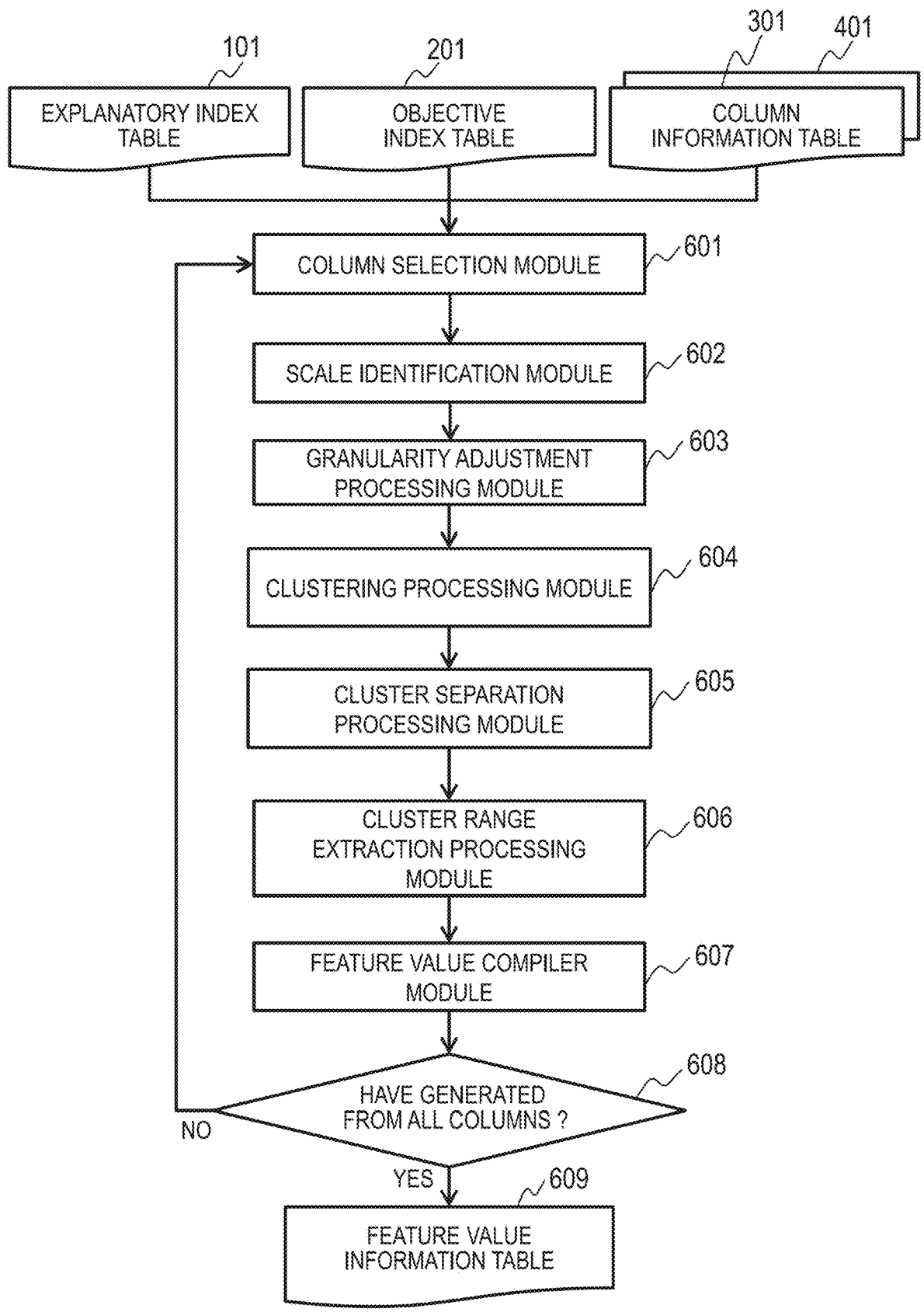
FIG. 5 is a detailed flowchart of the feature value generation module in Embodiment 1 of this invention.

FIG. 5 is a detailed flowchart of the feature value generation module 007 in Embodiment 1 of this invention.

This processing generates feature values from input tables. The term "feature value" is a value representing the relation between one or more explanatory index columns and the objective index column which is the target of the analysis. The processing at the steps starting from the column selection module 601 is executed by the central processing unit 001 in accordance with the commands described in the feature value generation module 007 which is an application program stored in the primary storage device 003.

First, an explanatory index table 101, a objective index table 201, a column information table 301, and a column information table 401 are input by the user to this system. The central processing unit 001 selects one or more columns to generate feature values from the explanatory index table 101 with a column selection module 601. Next, the central processing unit 001 identifies the types of the data in the selected columns with a scale identification module 602 and converts the data type of the column that requires conversion. The details of this processing will be described later with reference to FIG. 6.

Next, the central processing unit 001 adapts the unit of data compilation of the objective index column in the objective index table 201 (the sales 203 in the example of FIG. 2B) to the unit of data compilation in the explanatory index table 101 with a granularity adjustment processing module 603. The details of this processing will be described later with reference to FIGS. 7 and 8. Next, the central processing unit 001 performs clustering to group the joined data of the objective index column and the explanatory index columns with a clustering processing module 604. If a plurality of columns including a character-string-type column and a column of another data type (for example, a numerical-type column or a column converted from the time type into the numerical type) has been selected in the column selection module 601, the column(s) of the data type(s) other than the character string type are subjected to the clustering. The details of this processing will be described later with reference to FIGS. 9 and 10.

Next, the central processing unit 001 separates each of the generated clusters based on the geometric structure of the cluster with a cluster separation processing module 605. The details of this processing will be described later with reference to FIGS. 11, 12A and 12B. Next, the central processing unit 001 creates a feature value calculation condition column by extracting the value range of each column (or explanatory index) in each sub-cluster with a cluster range extraction processing module 606. The details of this processing will be described later with reference to FIG. 13.

Next, the central processing unit 001 counts the number of samples satisfying the generated feature value calculation conditions in the explanatory index table 101 and records the count value as a feature value to a feature value information table 609 with a feature value compiler module 607. The details of this processing will be described later with reference to FIG. 14. Next, the central processing unit 001 determines whether all combinations of all columns in the explanatory index table 101 have been selected with a determination module 608 and if any unselected combination exists, the central processing unit 001 performs the processing starting from the column selection module 601. As a result of the processing, the feature value generation module 007 outputs the created feature value information table 609.

Figure 6:
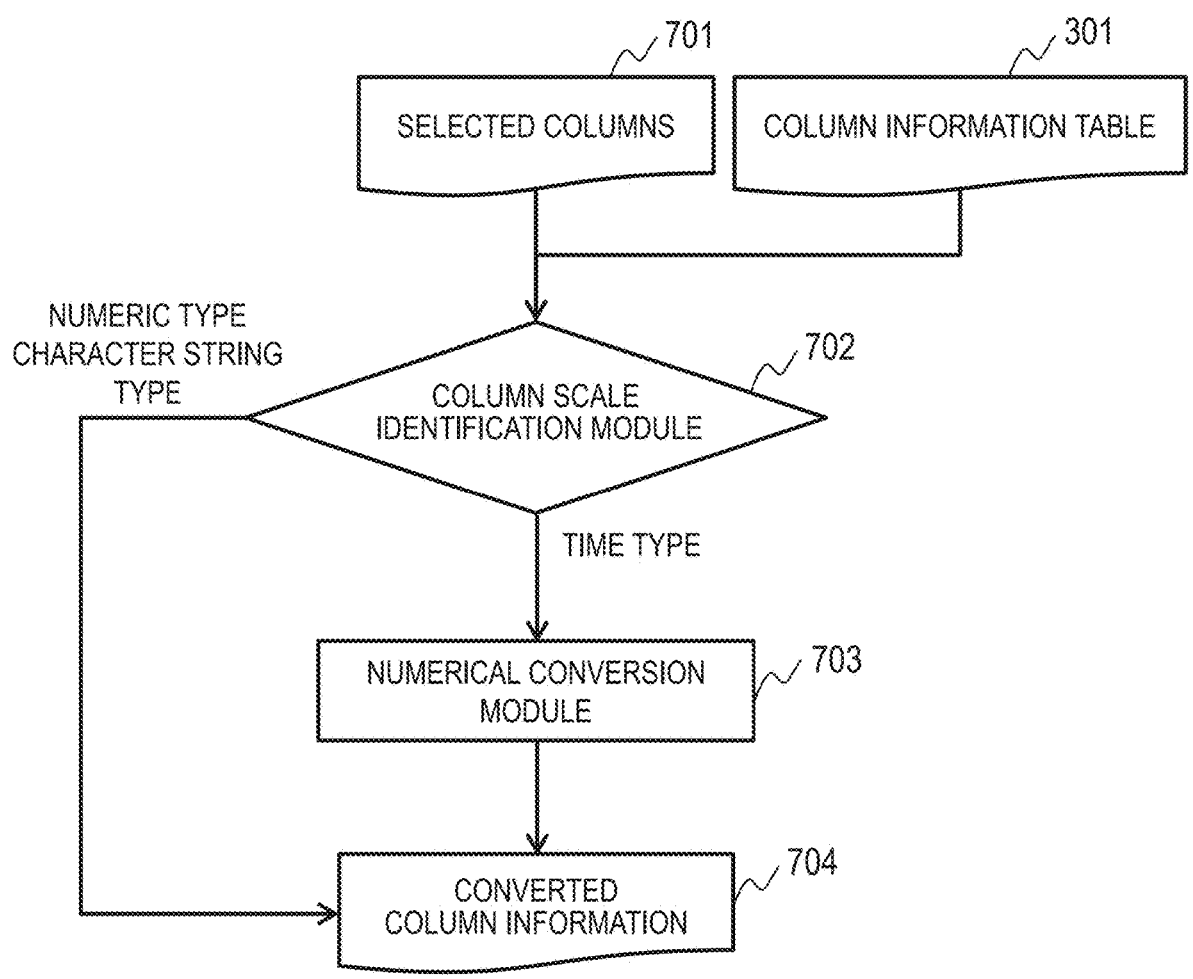
FIG. 6 is a detailed flowchart of a scale identification module in Embodiment 1 of this invention.

FIG. 6 is a detailed flowchart of the scale identification module 602 in Embodiment 1 of this invention.

This processing identifies the types of the selected columns and further, converts the column of the type that requires conversion and updates the column information.

Upon input of the selected columns 701 and the column information table 301, the central processing unit 001 extracts the types of the columns from the column information table 301 with a column scale identification module 702 and separates the columns to the time type and the other types. The time-type data is input to a numeric conversion module 703 and the central processing unit 001 converts the time-type data to the numerical type. The central processing unit 001 outputs converted column information 704 including the information on the data type of each column after the conversion.

Taking an example where the column information table 301 shown in FIG. 3A is input, the type for the value "entrance time" in the column name 302 is converted from "time type" to "numerical type" and a table including the converted values is output as the converted column information 704. This processing enables the entrance times to be handled in clustering (namely, to be handled as the values on an axis of coordinate in the clustering space). As understood from the above, the scale identification module 602 is to convert the time-type data to be handled in clustering; if there is another way to convert the time-type data to be handled in clustering, the scale identification module 602 can employ it, or if the time-type data can be handled in clustering without conversion, the scale identification module 602 can be omitted.

Figure 7:
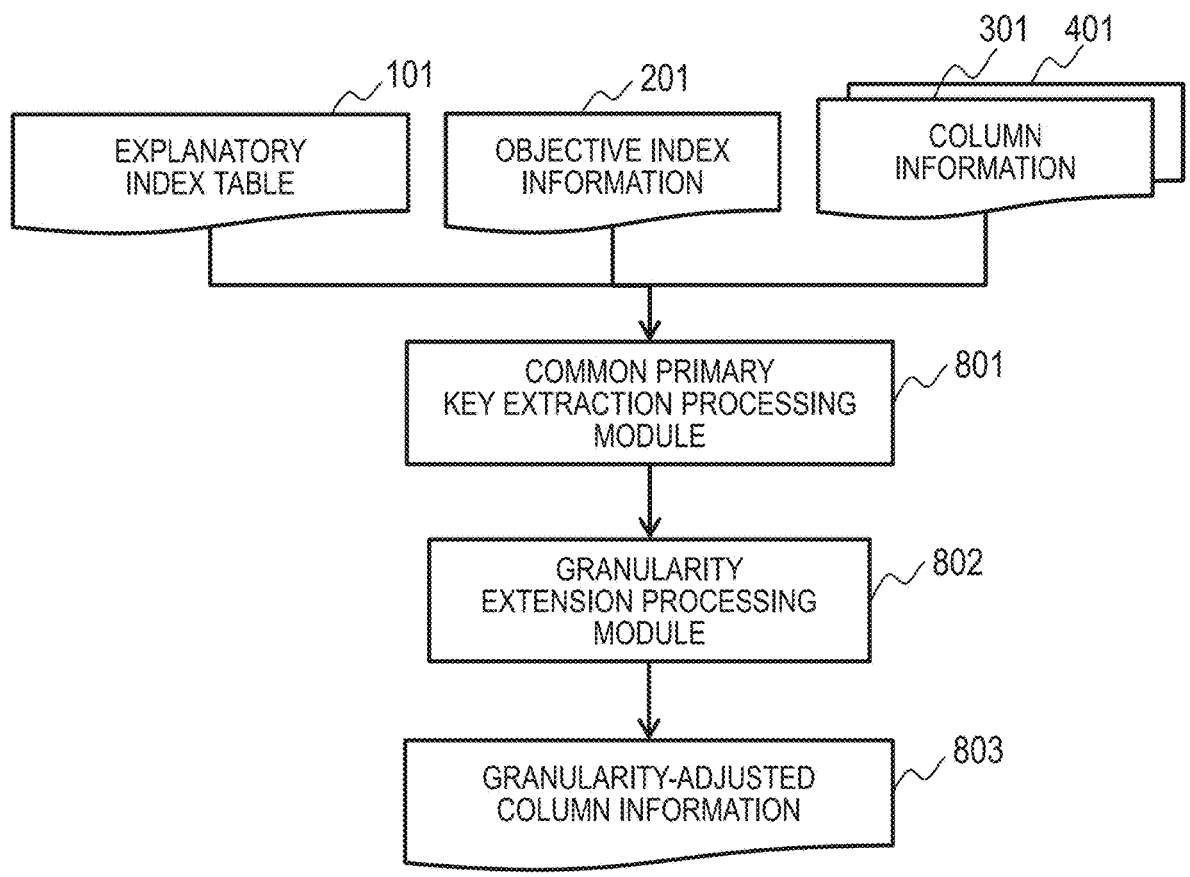
FIG. 7 is a detailed flowchart of a granularity adjustment processing module.

FIG. 7 is a detailed flowchart of the granularity adjustment processing module 603.

This processing creates a objective index table in which the unit of data compilation of the objective index is adapted to the unit of data compilation of the explanatory indices.

Upon input of the objective index table 201, the column information 301, and the column information 401, the central processing unit 001 extracts the primary key column information 404 indicating the information on the unit of data compilation from the column information 401 with a common primary key extraction processing module 801. The central processing unit 001 extracts the common column from the explanatory index table 101 based on the primary key information. Next, the central processing unit 001 newly creates a table in which the elements of the extracted column and the elements of the primary key column in the objective index table 201 are corresponding to each other with a granularity extension processing module 802. If the primary key column in the objective index table 201 does not include an element corresponding to an element in the column in the explanatory index table 101, the central processing unit 001 assigns a null to the element in the created table. Through this processing, granularity-adjusted column information 803, which is a objective index table extended to be in units of data compilation in the explanatory index table 101.

Figure 8:
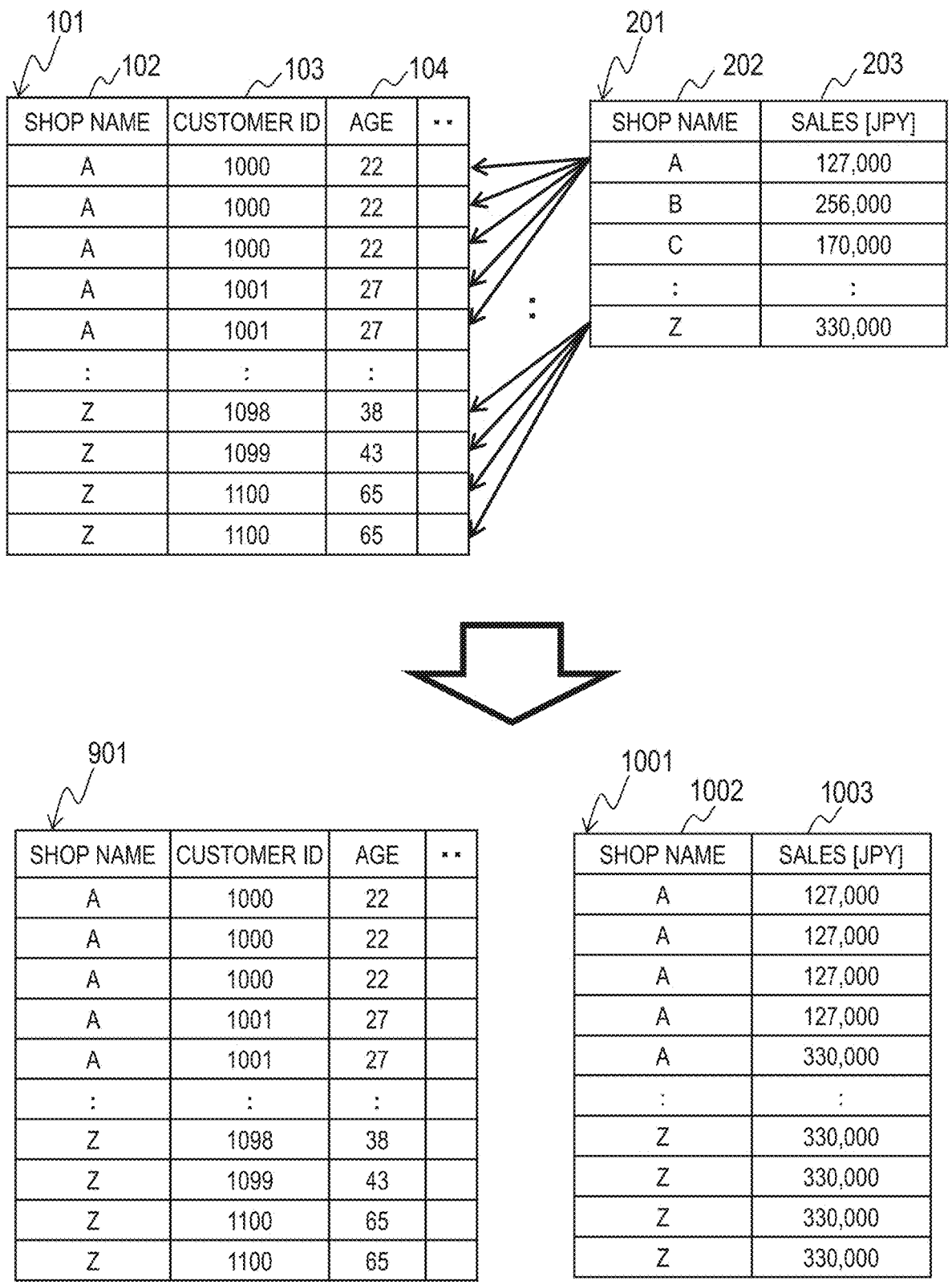
FIG. 8 is an explanatory diagram of a specific example of the processing of the granularity adjustment processing module in Embodiment 1 of this invention.

FIG. 8 is an explanatory diagram of a specific example of the processing of the granularity adjustment processing module 603 in Embodiment 1 of this invention.

In the specific example of FIG. 8, the shop name column 202 in the objective index table 201 is recognized as primary key column and the shop name column 102 in the explanatory index table 101 is extracted as common key. The central processing unit 001 extends each element in the objective index table 201 based on the corresponding elements in the shop name column 102. FIG. 8 shows the process to extend the objective index table in the granularity extension processing module 802. Through the granularity adjustment processing module 603, granularity-adjusted column information 1001 is obtained. Such an extended objective index table is referred to by the clustering processing module 604 in clustering data including the values of the objective index.

The above-described processing of the granularity adjustment processing module 603 is an example of processing to associate each set of values of explanatory indices such as the age and the entrance time stored in the explanatory index table 101 with a value of the sales stored in the objective index table 201 through a shop name; the central processing unit 001 may make such association using a different method.

Figure 9:
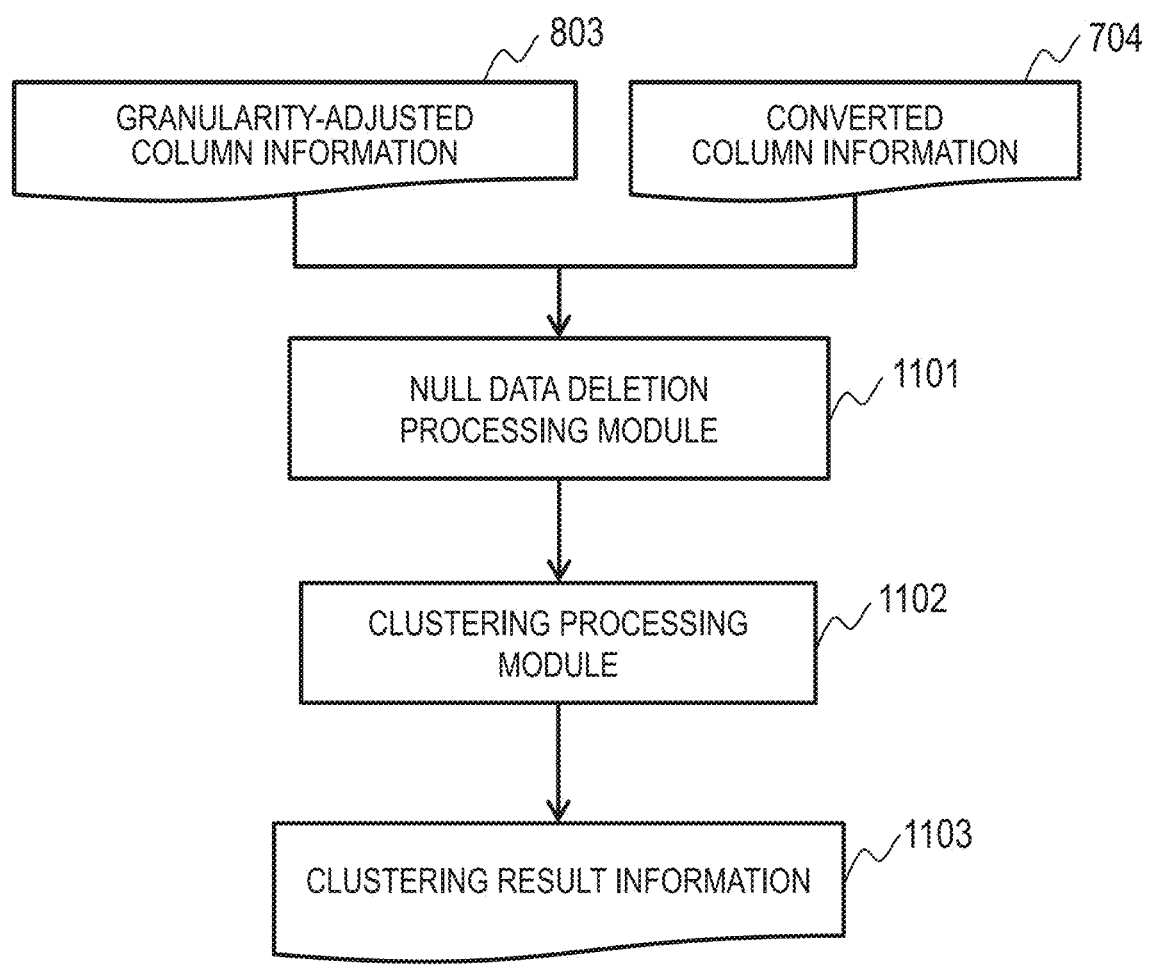
FIG. 9 is a detailed flowchart of a clustering processing module 604 in Embodiment 1 of this invention.

FIG. 9 is a detailed flowchart of the clustering processing module 604 in Embodiment 1 of this invention.

In this processing, data samples are clustered in a space defined by the axes of the input columns.

Figure 10:
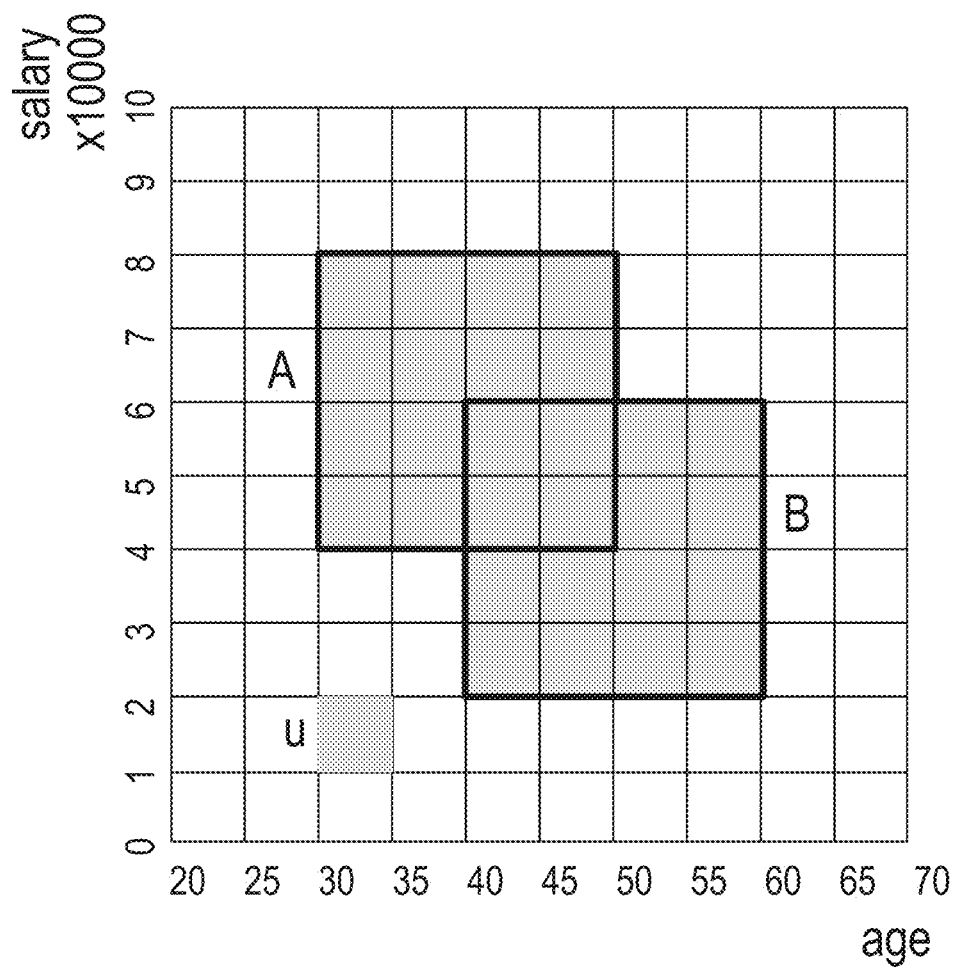
FIG. 10 is an explanatory diagram showing an example of clustering by grid-based clustering.

Upon input of the converted column information 704 obtained by the scale identification module 602 and the granularity-adjusted column information 803 obtained by the granularity adjustment processing module 603, the central processing unit 001 deletes the records including at least one piece of null data with a null data deletion processing module 1101. Next, the central processing unit 001 plots all records in the explanatory index table 101 to the space defined by the axes of the columns provided from the granularity-adjusted column information 803 with the converted column information 704 incorporated with a clustering processing module 1102 to group the data by a clustering method. When the column selection module 601 has selected n columns, numeric values in the n selected columns of each record are plotted in an n-dimensional space. Although the clustering processing module 1102 can employ any clustering method such as k-means, DBSCAN, or grid-based clustering, FIG. 10 shows grouping by grid-based clustering by way of example. The clustering processing module 1102 obtains clustering result information 1103 of a result of clustering using the columns of the granularity-adjusted column information 803 and the converted column information 704.

FIG. 10 is an explanatory diagram showing an example of clustering by grid-based clustering.

FIG. 10 shows an example of clustering with respect to two columns in a table, which are the age and the salary. The grid-based clustering first determines the number of grids for the cluster space and divides the space. In the example of FIG. 10, the age is assigned to the horizontal axis and the salary is assigned to the vertical axis; these axes are divided with specified spacing to create multiple grids. The density of data samples in each grid is calculated and a grid having a density higher than a threshold is determined to be an important grid, which is treated as a seed of a cluster. That is to say, one grid can become a smallest cluster (for example, the grid u). If multiple cluster seeds adjoin one another, they are joined into one cluster. In this way, data clustering can be carried out based on the regions dense with data samples. In the example of FIG. 10, the joined region of the shaded regions A and B surrounded by thick lines is obtained as a single cluster through clustering. Such a clustering method is described in Rakesh Agrawal, Johannes Gehrke, Dimitrios Gunopulos, Prabhakar Raghavan, "Automatic Subspace Clustering of High Dimensional Data for Data Mining Applications". FIG. 10 is an excerpt of FIG. 1 on p. 3 of this document.

For example, in the case where the column selection module 601 has selected the age 104 and the entrance time 105, the central processing unit 001 may plot the combination of the values of the age 104 and the entrance time 105 of each record to the two-dimensional space defined by the x-axis assigned the entrance time and the y-axis assigned the age to perform clustering. Alternatively, the central processing unit 001 may plot the combination of the values of the age 104 and the entrance time 105, and in addition, the associated value of the objective index (or the sales) in the granularity adjustment processing module 603 to the three-dimensional space defined by the x-axis assigned the entrance time, the y-axis assigned the age, and the z-axis assigned the sales to perform clustering. It can be expected that clustering the combinations of values inclusive of the value of the objective index facilitates determining the value ranges of explanatory indices highly correlated with the value of the objective index.

Figure 11:
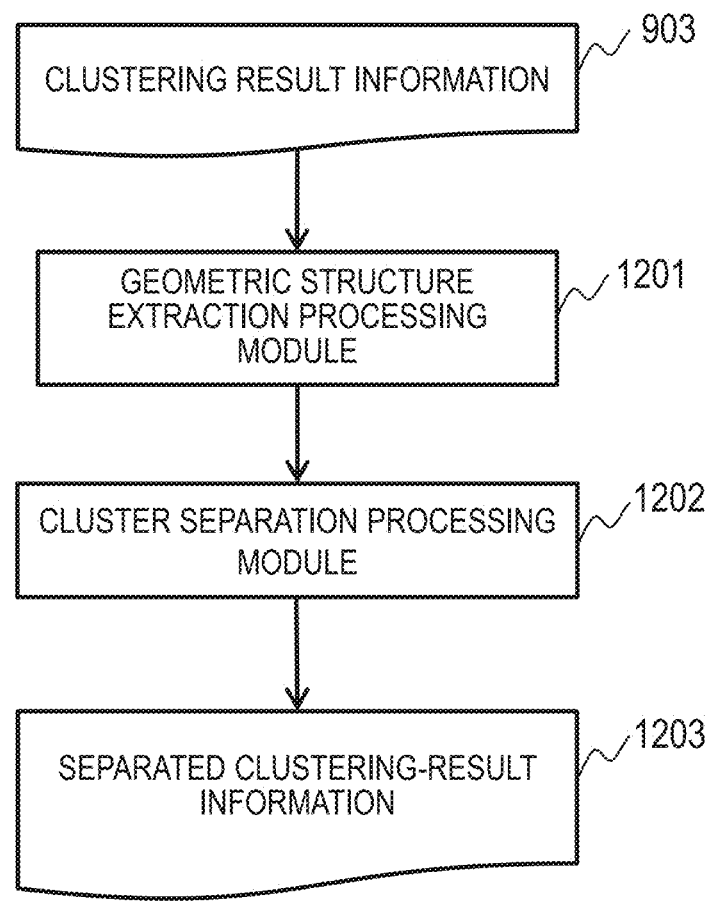
FIG. 11 is a detailed flowchart of a cluster separation processing module in Embodiment 1 of this invention.

FIG. 11 is a detailed flowchart of the cluster separation processing module 605 in Embodiment 1 of this invention.

This processing separates each cluster obtained in the clustering processing module 604 based on its geometric structure to create new clusters.

Upon input of clustering result information 903, the central processing unit 001 extracts geometric structures from each cluster in the clustering space with a geometric structure extraction processing module 1201. The geometric structure to be extracted can be a linear structure, a spherical structure, or a hyperrectangular structure. Next, the central processing unit 001 creates sub-clusters by separating each cluster based on the extracted structures with a cluster separation processing module 1202. The cluster separation processing module 1202 outputs separated clustering-result information 1203.

Figure 12A:
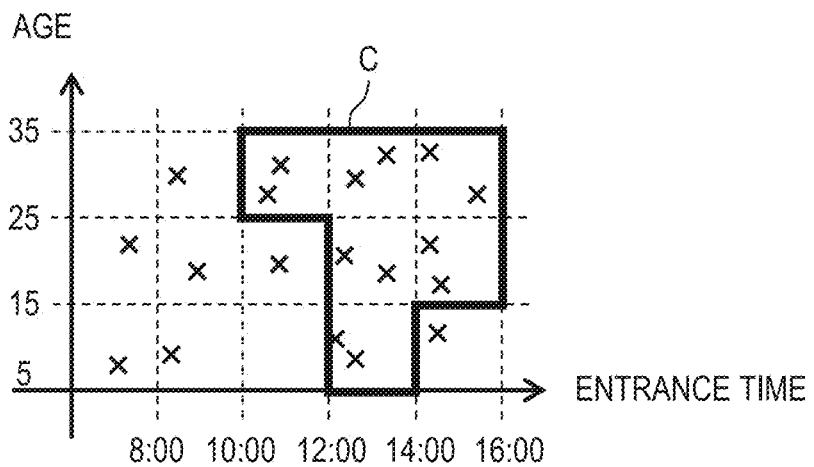
FIGS. 12A and 12B are explanatory diagrams of a specific example of separating a cluster in a cluster separation processing module in Embodiment 1 of this invention.
Figure 12B:
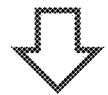
Figure 12B:
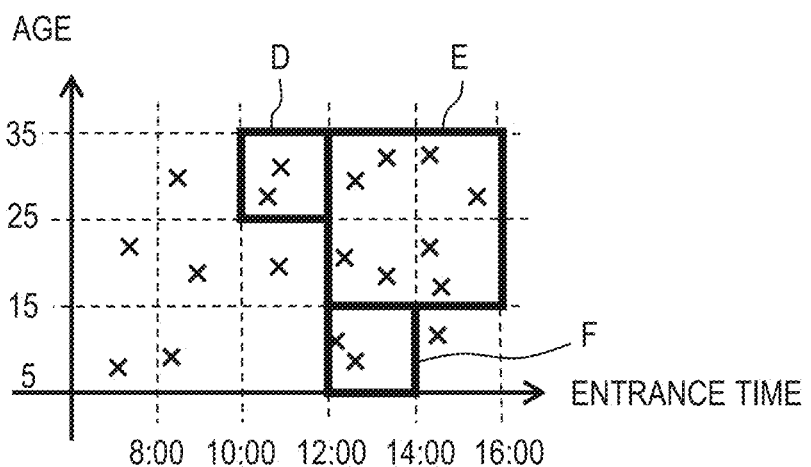

FIGS. 12A and 12B are explanatory diagrams of a specific example of separating a cluster in the cluster separation processing module 1202 in Embodiment 1 of this invention.

FIGS. 12A and 12B show an example of separating a cluster obtained by the clustering processing module 604 in the case where the entrance time column and the age column have been selected from the explanatory index table 101 and grid-based clustering explained with FIG. 10 has been performed.

FIG. 12A shows an example of a cluster before being separated. In this example, when two or more data samples are included in one grid, the grid is determined to be a seed of a cluster and the adjoining seeds of clusters are joined into a region C consisting of six grids as one cluster.

FIG. 12B is an example of separating the cluster in FIG. 12A. The central processing unit 001 extracts regions D, E, and F each having a geometrically rectangular structure (surrounded by a thick line) within the region C, which is the cluster obtained in the clustering processing module 604, and separates the cluster into the extracted rectangular structures. The finally output from the cluster separation processing module 605 is a set of clusters (the regions D, E, and F in this example) composed of only geometrically rectangular-shaped clusters.

Since two columns of the entrance time and the age are selected by the column selection module 601 as the columns subjected to clustering, this example extracts rectangular clusters in a two-dimensional space as shown in FIGS. 12A and 12B; however, when three columns are selected, rectangular cubic clusters are extracted in a three-dimensional space. Likewise, when four or more n columns are selected, hyperrectangular clusters are extracted in an n-dimensional space.

Figure 13:
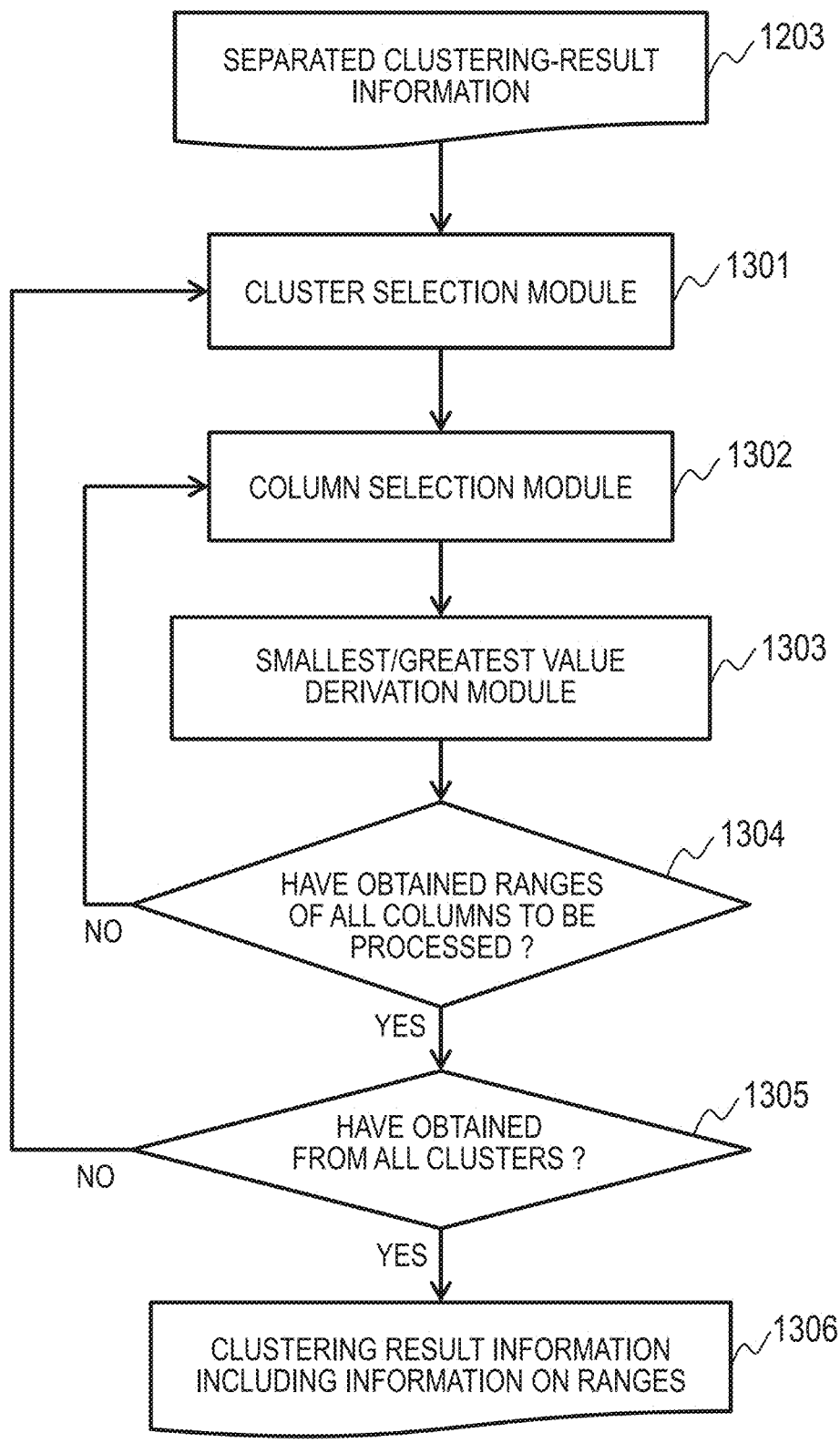
FIG. 13 is a detailed flowchart of a cluster range extraction processing module in Embodiment 1 of this invention.

FIG. 13 is a detailed flowchart of the cluster range extraction processing module 606 in Embodiment 1 of this invention.

This processing extracts the range of each column in each cluster. Feature values are generated based on the extracted ranges.

Upon input of the separated clustering-result information 1203, the central processing unit 001 selects the clusters one by one with a cluster selection module 1301. From the selected cluster, the central processing unit 001 selects the columns one by one with a column selection module 1302. The central processing unit 001 obtains the smallest value and the greatest value in the selected column as the range of the column with a smallest/greatest value derivation module 1303 and stores the values to the clustering result information. Next, the central processing unit 001 determines whether the ranges of all columns to be processed have been obtained with a determination module 1304 and further, determines whether the ranges of all columns to be processed have been obtained from all clusters with a determination module 1305. If the ranges of all columns to be processed have been obtained from all clusters, the cluster range extraction processing module 606 outputs clustering result information 1306 including the information on the ranges.

Figure 14:
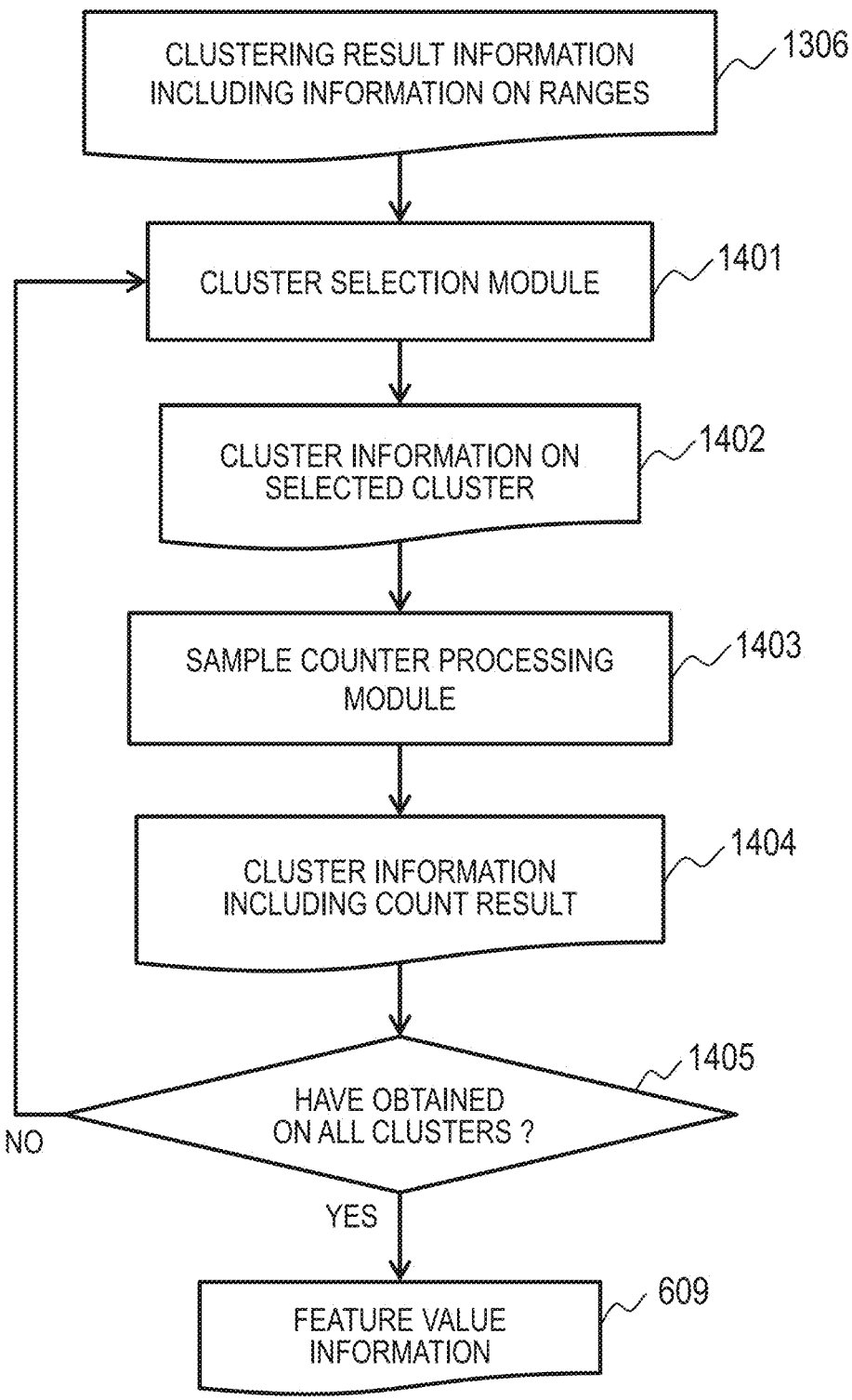
FIG. 14 is a detailed flowchart of a feature value compiler module in Embodiment 1 of this invention.

FIG. 14 is a detailed flowchart of the feature value compiler module 607 in Embodiment 1 of this invention.

This processing generates new feature values based on the clustering result and outputs feature value information including compiled information.

Upon input of the clustering result information 1306 including information on the ranges, the central processing unit 001 selects the clusters one by one with a cluster selection module 1401 and outputs cluster information 1402 on the selected cluster. Next, the central processing unit 001 executes a sample counter processing module 1403 using the cluster information 1402 on the selected cluster as an input and outputs cluster information 1404 including a count result, which is a compilation result about the feature value created from the cluster. The details of the sample counter processing module 1403 will be described later with reference to FIG. 15. Next, the central processing unit 001 determines whether feature value information has been generated from all the clusters with a determination module 1405. If the determination is that feature value information has been generated from all clusters, the feature value compiler module 607 finally outputs a feature value information table 609 including the feature values created from the clustering result and the compilation results.

The feature value information table 609 to be output includes feature values separately calculated on individual values of the primary key based on the conditions to calculate a feature value obtained through clustering. For example, in the case where a range of age "from 15 to 35" and a range of entrance time "from 12:00 to 16:00" are obtained for the conditions to calculate a feature value for a cluster obtained by clustering, the central processing unit 001 determines whether the values of the age 104 and the entrance time 105 satisfy these conditions (meaning whether the values are within the specified ranges) on each sample (or each record) of the explanatory index table 101. The central processing unit 001 counts the number of samples satisfying these conditions for each value of the primary key (or the shop name 202) and stores the result to the feature value information table 609 as a feature value.

Figure 15:
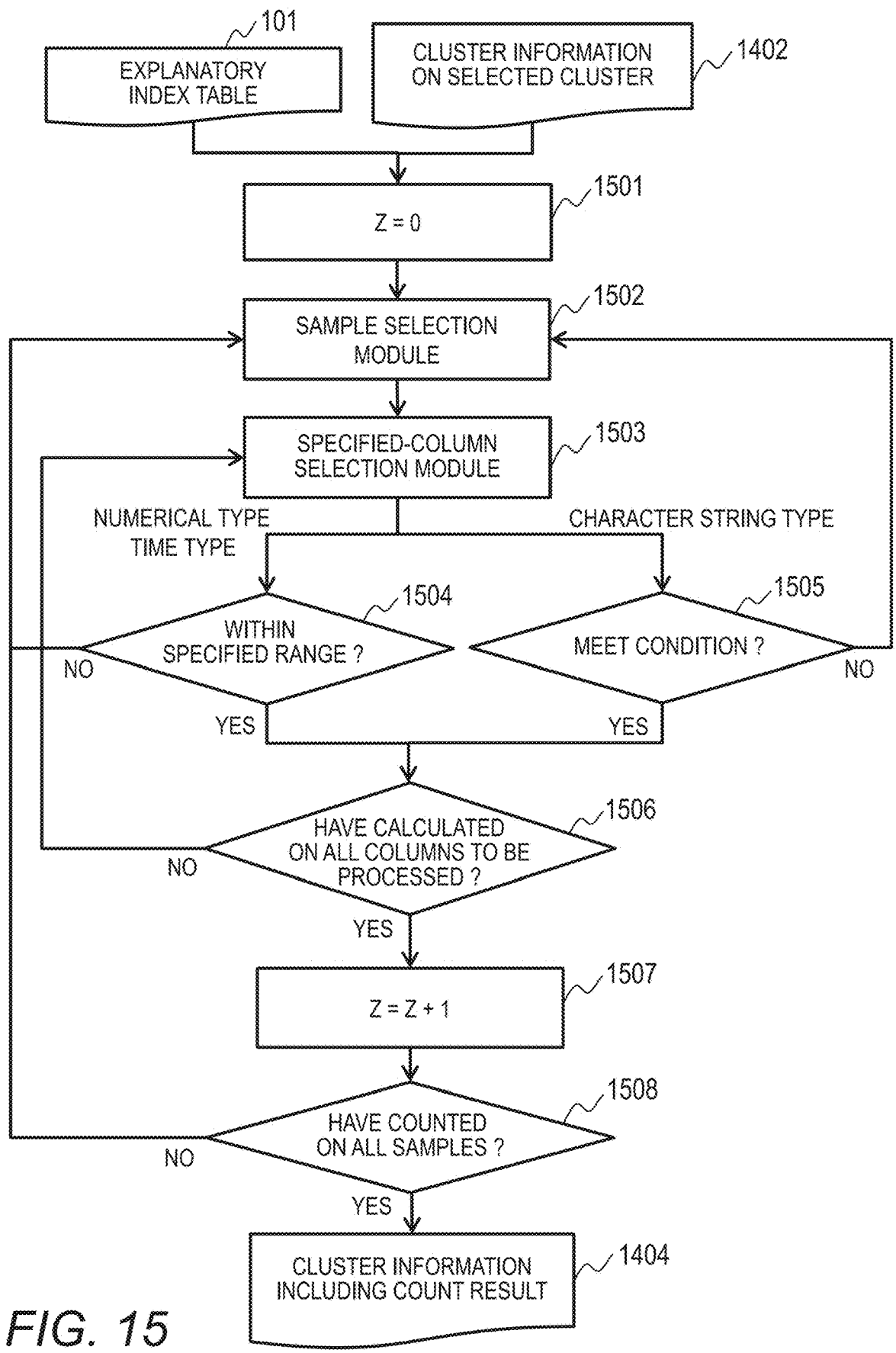
FIG. 15 is a detailed flowchart of a sample counter processing module in Embodiment 1 of this invention.

FIG. 15 is a detailed flowchart of the sample counter processing module 1403 in Embodiment 1 of this invention.

This processing calculates a feature value generated from each cluster.

Upon input of the cluster information 1402 on the selected cluster and the explanatory index table 101, the central processing unit 001 resets a variable Z to 0 with an initialization module 1501. Next, the central processing unit 001 selects the samples one by one from the explanatory index table 101. Next, the central processing unit 001 selects the columns one by one from the selected sample with a specified-column selection module 1503.

If the selected column is the numerical type or the time type, the central processing unit 001 determines whether the value of the column is within the range of the corresponding column specified in the cluster information 1402 on the selected cluster with a determination module 1504. If the selected column is the character string type, the central processing unit 001 determines whether the value of the column matches the value of the corresponding column specified in the cluster information 1402 on the selected column with a determination module 1505. If the result of the determination in the determination module 1504 or 1505 is No, the processing is returned to the sample selection module 1502 to select the next sample.

If the result of the determination in the determination module 1504 or 1505 is Yes, the central processing unit 001 determines whether calculation on all the columns to be processed has been completed with a determination module 1506. If the result of the determination in the determination module 1506 is No, the processing is returned to the specified-column selection module 1503 to select the next column. If the result of the determination in the determination module 1506 is Yes, the central processing unit 001 increments the value of the count variable Z with a counter module 1507. Next, the central processing unit 001 determines whether all samples have been processed with a determination module 1508 and if the result of determination is No, the processing returns to the sample selection module 1502 to continue the processing on the remaining samples. If the result of determination in the determination module 1508 is Yes, the central processing unit 001 outputs cluster information 1404 including the count result or the compilation result on the cluster.

Now, effects of this embodiment are described with reference to specific examples. For example, in the case where the region C in FIG. 12A is extracted as a cluster, the cluster range extraction processing module 606 extracts the range from the smallest value to the greatest value of the plurality of grids in the cluster, which is expressed by the value ranges of the explanatory indices of a range from 10:00 to 16:00 in entrance time and a range from 5 to 35 in age, as the condition to calculate a feature value. If the correlation between the feature value calculated about each primary key (in this example, each shop) based on this range and the value of the objective index (in this example, the sales) is sufficiently high, it can be said that this range is the value ranges of the explanatory indices frequently showing high correlation with the magnitude of the value of the objective index (that is to say, the frequency in occurrence or the number of times of occurrence of the values of the explanatory indices within this range is a factor that well explains the value of the objective index). This approach enables the boundary of a factor that explains the value of the objective index, which cannot be extracted by simple grid-based clustering, to be extracted as a range that can be interpreted easily by humans, like the above-described range of entrance time from 10:00 to 16:00 and range of age from 5 to 35. Estimating the objective index based on the correlation of the feature value and the objective index will be described specifically in Embodiment 2.

However, the above-described range include a region of low density in data sample (for example, the region including no data samples in the range of age from 5 to 15 and the range of the entrance time from 10:00 to 12:00). In contrast, the range extracted from a separated sub-cluster of Region E, the range of the entrance time from 12:00 to 16:00 and the range of the age from 15 to 35, do not include a grid of low density in data sample. The same applies to the ranges extracted from the regions D and F.

As noted from the above, separating an extracted cluster into a plurality of rectangular clusters which do not include a grid of low density in data sample eliminates the value ranges of explanatory indices including few data samples from the conditions to calculate the feature value. As a result, it is expected to determine value ranges of explanatory indices that explain the value of the objective index better.

If value ranges of explanatory indices extracted from a cluster before being separated sufficiently explains the objective index, the value ranges can be useful for interpretation by humans. The way to separate a cluster is not limited to one pattern; for example, the region C in FIG. 12A can be separated into a sub-cluster ranging from 10:00 to 16:00 in entrance time and from 25 to 35 in age, a sub-cluster ranging from 12:00 to 14:00 in entrance time and from 5 to 25 in age, and a sub-cluster ranging from 14:00 to 16:00 in entrance time and from 15 to 25 in age. Accordingly, the central processing unit 001 may select the cluster before being separated and the sub-clusters after being separated in various patterns one by one with the cluster selection module 1301, calculate the value ranges of explanatory indices of each cluster with the column selection module 1302 to the determination module 1304, and hold the calculated ranges as conditions to calculate a feature value.

Embodiment 2

Embodiment 2 of this invention is described with reference to the drawings. Except for the differences described in the following, the components of the data analysis support system in Embodiment 2 have the same functions as the components denoted by the same reference signs in Embodiment 1 shown in FIGS. 1 to 15; accordingly, description thereof is omitted.

The data analysis support system in Embodiment 2 is the same as the data analysis support system in Embodiment 1, except that a feature value generation module 2_1601 in place of the feature value generation module 007 is stored in the secondary storage device 002.

Figure 16:
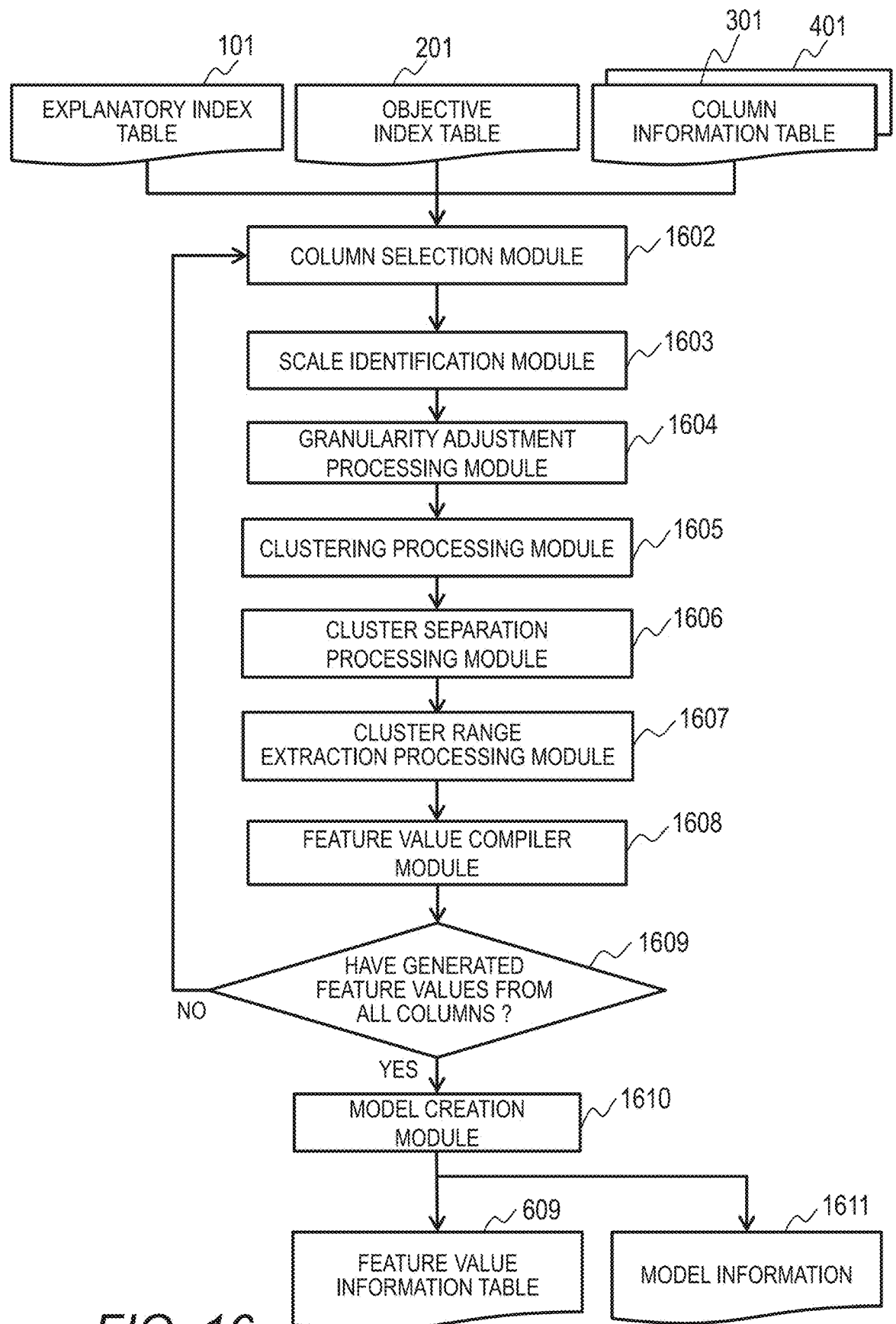
FIG. 16 is a detailed flowchart of a feature value generation module 2 in Embodiment 2 of this invention.

FIG. 16 is a detailed flowchart of the feature value generation module 2_1601 in Embodiment 2 of this invention.

The processing from the column selection module 1602 to the determination module 1609 in FIG. 16 is the same as the processing from the column selection module 601 to the determination module 608 in FIG. 5; accordingly, description thereof is omitted. The explanatory index table 101, the objective index table 201, the column information table 301, and the column information table 401 to be input and the feature value information table 609 to be created are the same as those in Embodiment 1.

If the result of determination in the determination module 1609 is Yes, the central processing unit 001 executes a model creation module 1610 using the created feature value information table 609 as an input to create model information 1611. The details of this processing will be described later with reference to FIG. 17. This processing newly creates model information for estimating the objective index using a created feature value. The created model enables automating the steps of creating a feature value that could be a factor in the analysis target and repeating testing the model, which have been performed manually by the analyst, to support the analyst in making analysis.

Figure 17:
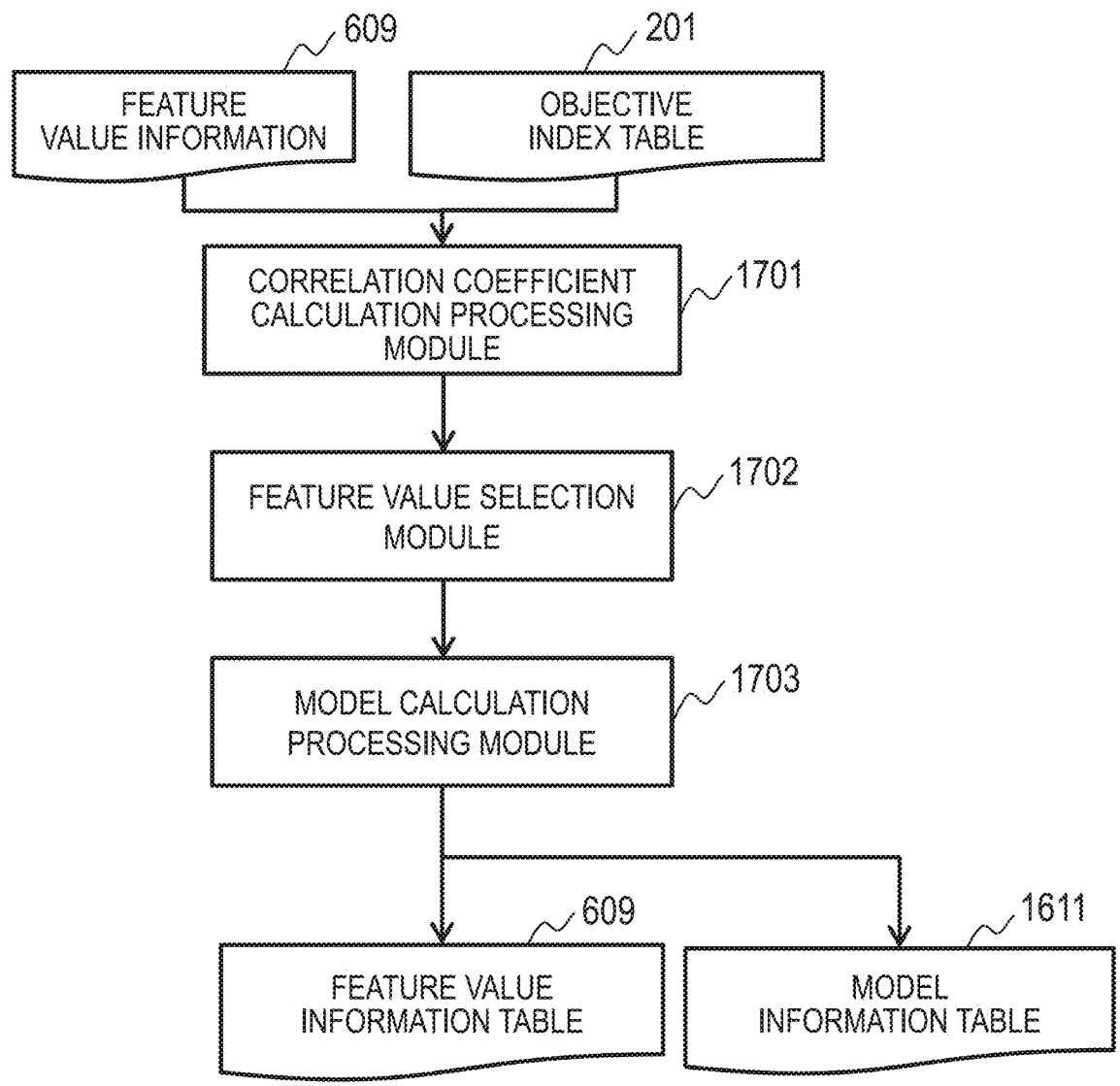
FIG. 17 is a detailed flowchart of a model creation module in Embodiment 2 of this invention.

FIG. 17 is a detailed flowchart of the model creation module 1610 in Embodiment 2 of this invention.

This processing creates a model for estimating the objective index from the created feature value information table 609.

Upon input of the feature value information table 609 and the objective index table 201, the central processing unit 001 calculates the correlation coefficients between individual feature values and the objective index with a correlation coefficient calculation processing module 1701. The central processing unit 001 selects a representative feature value to be used for a model based on the calculated correlation coefficients with a feature value selection module 1702. The central processing unit 001 derives a model using the selected representative feature value with a model calculation processing module 1703. The model derived by the model calculation processing module 1703 can be a linear regression model obtained by multiple regression analysis, a logarithmic model, or a power-law model. The model calculation processing module 1703 outputs model information 1611 including the generated feature values and the obtained model formula.

It should be noted that this invention is not limited to the above-described embodiments but include various modifications. For example, the above-described embodiments have provided details for the sake of better understanding of this invention; they are not limited to those including all the configurations that have been described. A part of the configuration of each embodiment may be replaced with a configuration of another embodiment or a configuration of an embodiment may be incorporated to a configuration of another embodiment. A part of the configuration of each embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that most of all components are actually interconnected.

What is claimed is:

1. A data analysis support system comprising:
   a processor; and
   a storage device coupled to the processor, wherein the storage device includes instructions that when are executed by the processor, cause the processor to perform operations comprising:
   storing, in the storage device, objective index information in which values of a primary key of an index table are associated with values of an objective index and explanatory index information in which values in common with the values of the primary key are associated with sets of values of a plurality of explanatory index items, and the values of the primary key are associated with the sets of values of the plurality of explanatory index items, wherein the plurality of explanatory index items includes an item of a character string type and an item of data type;
   selecting, by a cluster selection module, one or more explanatory index items of the plurality of explanatory index items;
   performing, by the cluster selection module, clustering on values of the selected one or more explanatory index items of data types other than the character string type, wherein the clustering includes creating combinations of values inclusive of a value of the objective index that facilitates determining value ranges of explanatory indices, wherein the values ranges of explanatory indices frequently show high correlation with magnitude of the value of the objective index;
   determining, by a determination module, the value ranges of explanatory indices in each duster obtained through the clustering and outputting the determined value ranges;
   determining, by the determination module on each set of the sets of values of the plurality of explanatory index items, whether the values of the selected one or more explanatory index items satisfy a condition that all the values of the selected one or more explanatory index items are within the determined value ranges, count number of the sets of values of the explanatory index items satisfies the condition for each value of the primary key of the index table, and outputting the counted number of the sets of values of explanatory index items as a feature value;

responsive to a result of determination that feature values are generated from input tables based on the determination of the values of selected one or more explanatory index items and the clustering on the values of the selected one or more explanatory index items, executing a model creation module using a created feature value information table as an input to create a model for explaining the objective index based on correlation between the feature values on the values of the primary key and the values of the objective index on the values of the primary key; and automating, based on the created model, steps of creating a feature value as a factor in an analysis target to estimate the objective index.

2. The data analysis support system according to claim 1, wherein the storage device is configured to hold information indicating data types on the explanatory index items included in the explanatory index information.

3. The data analysis support system according to claim 1, wherein the processor is configured to perform clustering on sets of values, each set including values of one or more selected explanatory index items and a value of the objective index associated with a value of the primary key.

4. The data analysis support system according to claim 1, wherein the processor is configured to:

plot combinations of values of the one or more selected explanatory index items to a space divided into a plurality of grids, each grid having a predetermined size and in a case where a plurality of grids in which density of plotted combinations of values is higher than a predetermined threshold adjoin another value; include the plurality of grids into a cluster in the clustering the values of the one or more selected explanatory index items; and determine a range of the plurality of grids included in each cluster in the space to be the value ranges of the explanatory index items in each cluster.

5. The data analysis support system according to claim 4, wherein the processor is configured to separate each cluster into a plurality of rectangular, rectangular cubic, or hyper rectangular sub-clusters which do not include a grid in which the density of the plotted combinations of values does not exceed the predetermined threshold.

6. A data analysis support method to be executed by a computer system including a processor and a storage device coupled to the processor, the data analysis support method comprising:

storing in the storage device, by the computer system, objective index information in which values of a primary key of an index table are associated with values of an objective index, and explanatory index information in which values in common with the values of the primary key are associated with sets of values of a plurality of explanatory index items, and the values of the primary key are associated with the sets of values of the plurality of explanatory index items, wherein the plurality of explanatory index items includes an item of a character string type and an item of data type;

selecting, by a cluster selection module of the computer system, one or more explanatory index items of the plurality of explanatory index items;

performing, by the cluster selection module, clustering on values of the selected one or more explanatory index items of data types other than the character string type, wherein the clustering includes creating combinations of values inclusive of a value of the objective index that facilitates determining value ranges of explanatory indices, wherein the values ranges of explanatory indices frequently show high correlation with magnitude of the value of the objective index;

determining, by a determination module of the computer system, the value ranges of explanatory indices in each cluster obtained through the clustering and outputting the determined value ranges;

determining, by the determination module on each set of the sets of values of the plurality of explanatory index items, whether the values of the selected one or more explanatory index items satisfy a condition that all the values of the selected one or more explanatory index items are within the determined value ranges, count number of the sets of values of the explanatory index items satisfies the condition for each value of the primary key of the index table, and outputting the counted number of the sets of values of explanatory index items as a feature value;

responsive to a result of determination that feature values are generated from input tables based on the determination of the values of selected one or more explanatory index items and the clustering on the values of the selected one or more explanatory index items, executing a model creation module of the computer system using a created feature value information table as an input to create a model for explaining the objective index based on correlation between the feature values on the values of the primary key and the values of the objective index on the values of the primary key; and automating, based on the created model by the computer system, steps of creating a feature value as a factor in an analysis target to estimate the objective index.

7. The data analysis support method according to claim 6, wherein the storage device is configured to hold information indicating data types on the explanatory index items included in the explanatory index information.

8. The data analysis support method according to claim 6, wherein the processor performs clustering on sets of values, each set including values of one or more selected explanatory index items and a value of the objective index associated with a value of the primary key.

9. The data analysis support method according to claim 6, wherein the processor plots combinations of values of the one or more selected explanatory index items to a space divided into a plurality of grids, each grid having a predetermined size and in a case where a plurality of grids in which density of plotted combinations of values is higher than a predetermined threshold adjoin another value, includes the plurality of grids into a cluster in the clustering the values of the one or more selected explanatory index items, and wherein, the processor determines a range of the plurality of grids included in each cluster in the space to be the value ranges of the explanatory index items in each cluster.

10. The data analysis support method according to claim 9, wherein the processor separates each cluster into a plurality of rectangular, rectangular cubic, or hyper rectangular sub-clusters which do not include a grid in which the density of the plotted combinations of values does not exceed the predetermined threshold.

* * * * *